United States Patent [19]

Kallenberger

[11] Patent Number: 5,558,446
[45] Date of Patent: Sep. 24, 1996

[54] BEARING ARRANGEMENT WITH GRAVITY-FED LUBRICATION

[75] Inventor: Harvey J. Kallenberger, Wind Lake, Wis.

[73] Assignee: Harnischfeger Corporation, Brookfield, Wis.

[21] Appl. No.: 459,709

[22] Filed: Jun. 2, 1995

[51] Int. Cl.⁶ .................................................. F16C 33/10
[52] U.S. Cl. ......................... 384/368; 384/399; 384/401; 384/420
[58] Field of Search .................................. 384/368, 369, 384/370, 371, 399, 400, 401, 420, 421, 422

[56] References Cited

U.S. PATENT DOCUMENTS

| | | | |
|---|---|---|---|
| 574,542 | 1/1897 | Kinsey | 384/400 |
| 1,120,344 | 12/1914 | Templin | 384/371 |
| 1,145,929 | 7/1915 | Smith | 384/369 X |
| 1,374,267 | 4/1921 | Whitehead | 384/368 |
| 1,406,560 | 2/1922 | Houghton | 254/406 |
| 1,660,433 | 2/1928 | Christman | 384/368 |
| 1,676,219 | 7/1928 | Seymour et al. | 384/368 |
| 2,285,784 | 6/1942 | Scott | 384/368 |
| 2,872,256 | 2/1959 | Thomson | 384/429 |
| 3,066,990 | 12/1962 | Frölich | 384/368 |
| 3,370,897 | 2/1968 | Rylatt | 384/368 |
| 3,959,899 | 6/1976 | Rangaswamy | 384/417 X |
| 4,480,849 | 11/1984 | Yano et al. | 280/433 |
| 4,734,020 | 3/1988 | Inaba et al. | 418/55 |
| 4,874,302 | 10/1989 | Kobayashi et al. | 418/55 |

*Primary Examiner*—Thomas R. Hannon
*Attorney, Agent, or Firm*—Jansson & Shupe, Ltd.

[57] ABSTRACT

A "pancake-like" thrust bearing arrangement with gravity-fed lubrication is angular to a horizontal plane and has a top edge above such plane. A load-support structure oscillates on the bearing. Such bearing has a lubricant feed aperture at the top edge and plural lubrication grooves formed in the flat bearing face and connected to such aperture by feed passages. The grooves are oriented so that they "run downhill," i.e., so that they intersect a circle concentric with the bearing center. Grease moves by gravity along the grooves which are "closed-ended" to help prevent premature expulsion of grease from the bearing face.

16 Claims, 6 Drawing Sheets

5,558,446

BEARING ARRANGEMENT WITH GRAVITY-FED LUBRICATION

FIELD OF THE INVENTION

This invention relates generally to machine components and, more particularly, to bearing-equipped components which move relative to one another.

BACKGROUND OF THE INVENTION

Friction-reducing devices known as bearings are available in a wide variety of types and are used in machines of virtually all sizes and complexities. A well-known type uses component parts which roll relative to other parts. For example, bicycle hubs use ball bearings, with or without a bearing "race." And every electrically powered home appliance uses one or more bearings. To enlarge the scale of the examples, railroad freight car wheels are supported on tapered roller bearings. Bearings of the foregoing types incorporate a multiplicity of rolling components such as spherical balls, solid cylindrical rollers, slender cylindrical needles or solid tapered rollers.

Such bearings share certain common features. One is that they operate at relatively high speed. Another is that they are known as "hydrodynamically" lubricated bearings in that their operating speed helps assure that critical surfaces be continually coated with a film of lubricant.

However, bearings having rolling components are by no means the only type of bearings used. Another major bearing type is a journal bearing, an example of which is a hollow-cylinder-shaped bearing. Yet another bearing type is a flat, washer-shaped thrust bearings. Journal and flat thrust bearings involve sliding rather than rolling motion. When used in high-speed applications, such bearings are hydrodynamically lubricated and in low speed applications, such bearings are known as "boundary-lubricated" bearings.

With larger machines, providing adequate bearing lubrication—especially for boundary-lubricated bearings—can present difficult problems. Nowhere is this more true than in large mobile machines such as earth-moving and earth-excavating machinery.

Such machinery is available in a wide variety of types ranging from the familiar rubber-tire mounted and crawler-track mounted to the less-common walking dragline. A dragline is often used for removing top soil and "overburden" to expose a valuable mineral, e.g., coal, beneath the earth's surface.

A dragline is equipped with an angularly-extending boom from which is suspended a "bucket" having an open mouth and digging teeth, both facing toward the main portion of the machine. Overburden is removed by placing the bucket on the ground at a point distant from the machine and pulling it toward the machine, filling the bucket in the process. Once filled, the machine pivots about a central axis and the bucket emptied at a spoil pile somewhat away from the area being excavated.

To give some perspective to the following discussion, a large walking dragline—made by Harnischfeger Industries of Milwaukee, Wis., and incorporating the invention—has a main housing portion (including the machinery deck, operator's cab and the like) which is about 105 feet long, about 80 feet wide, about 40 feet high and weighs about nine million pounds. The boom extends about 300 feet and the capacity of the digging bucket is about 80 cubic yards. The walk legs of such dragline take steps about seven feet in length.

Because a dragline bucket is often off-center of the boom and machine centerline, such bucket imposes lateral loads at the end of the boom. To accommodate such lateral loading and reduce wear on the bucket ropes, the sheave assembly at the end of the boom is capable of oscillatory motion. In a known sheave assembly, the washer-like journal bearing supporting the assembly has grease grooves located on a radius from the centerline of oscillation. Oscillation urges grease along the grooves but not across the grooves.

For a machine like the dragline described above, its mere size militates against easy maintenance. For example, lubrication of elevated parts along and at the end of the boom necessitates taking the machine out of service and moving the boom near to the ground to obtain easy access to such parts.

An improved bearing arrangement which addresses the inaccessibility of the bearing, which provides good lubrication to relatively-moving surfaces and which is suitable for use with a thrust-type journal bearing would be an important advance in the art.

OBJECTS OF THE INVENTION

It is an object of the invention to provide an improved bearing overcoming some of the problems and shortcomings of the prior art.

Another object of the invention is to provide an improved boundary-lubricated thrust bearing.

Another object of the invention is to provide an improved bearing using gravity-fed lubricant.

Still another object of the invention is to provide an improved gravity-lubricated bearing for applications involving a non-horizontal bearing face.

Another object of the invention is to provide an improved bearing which provides for lubrication of substantially the entirety of the bearing face.

Yet another object of the invention is to provide an improved bearing useful to support oscillating loads, particularly loads exhibiting oscillations of less than 90°.

Another object of the invention is to provide an improved bearing wherein lubricant is retained on the bearing face. How these and other objects are accomplished will become more apparent from the following descriptions and from the drawings.

SUMMARY OF THE INVENTION

The invention involves an arrangement having a generally planar thrust bearing which is angularly oriented with respect to a horizontal reference plane. The bearing has a center and a face circumscribing such center. And because of its angular orientation, such bearing has a region of highest elevation above the horizontal plane. The bearing has a plurality of lubrication grooves and a load-supporting structure oscillates on the bearing through an arc of oscillation.

In the improvement, the bearing includes a lubricant feed aperture at or substantially at the top of the bearing, i.e., at the region of highest elevation. The grooves are below the feed aperture and are connected to such aperture so that the force of gravity tends to urge grease downward from the aperture and along the grooves.

And at least one of the grooves (and preferably several or all of the grooves) intersects a circle concentric with the bearing center. That is to say, such groove angularly "cuts across" the bearing face. Thus, as the support structure oscillates across such face, there is a tendency to wipe grease from the groove and across the face rather than merely urge grease along the groove. Grooves are gravity-fed and the face of the bearing is well lubricated.

In another aspect of the invention, the grooves are connected to the feed aperture by a feed passage with which each groove intersects. Such passage has a length and at least a portion of such length is concentric with the bearing center rather than angular across the face as in the case of the above-described groove. To put it another way, substantially all points on the feed passage are about equidistant from the bearing center. When the feed passage is so arranged, oscillation tends to urge grease along the passage but has relatively little tendency to wipe the grease out of the passage.

The new apparatus is configured to not only provide good lubrication but also to retain grease on the bearing face. More specifically, the thrust bearing has an outer edge and the grooves and the feed passage are spaced from such edge by an outer barrier portion. The barrier portion substantially prevents grease from flowing across such outer edge. Similarly, the thrust bearing has an inner edge and the grooves and the feed passage are spaced from the inner edge by an inner barrier portion. Such inner portion prevents grease from flowing across such inner edge.

In another aspect of the invention, each of the grooves has an end and each groove has an arc length between its end and its intersection with the feed passage. Such arc length is about equal to the arc of oscillation.

The apparatus is configured to help assure that substantially the entire bearing face is lubricated and that such lubrication is by gravity-feeding. The bearing has first and second groups of grooves formed in its face and also has a top region, a bottom region and a mid-section between the regions.

A first feed passage is in the top region and a second such passage in the bottom region. In a specific embodiment, the first feed passage is along the bearing outer edge and the second passage is along the bearing inner edge.

Each groove in the first group of grooves is connected to the first feed passage and extends therefrom generally toward the bearing center. On the other hand, each groove in the second group of grooves is connected to the second feed passage and extends therefrom generally away from the center. In that way, grease flow is generally downwardly from the top region.

In another, less preferred embodiment, the groove extends between the outer barrier portion and the inner barrier portion but, in arc length, is less than the arc of oscillation. Such groove may be curved or straight.

It is also to be appreciated that grooves may be formed in either or both sides of the bearing. Further details of the invention are set forth in the following detailed description and in the drawings.

DETAILED DESCRIPTION OF PREFERRED EMBODIMENTS

Figure 1:
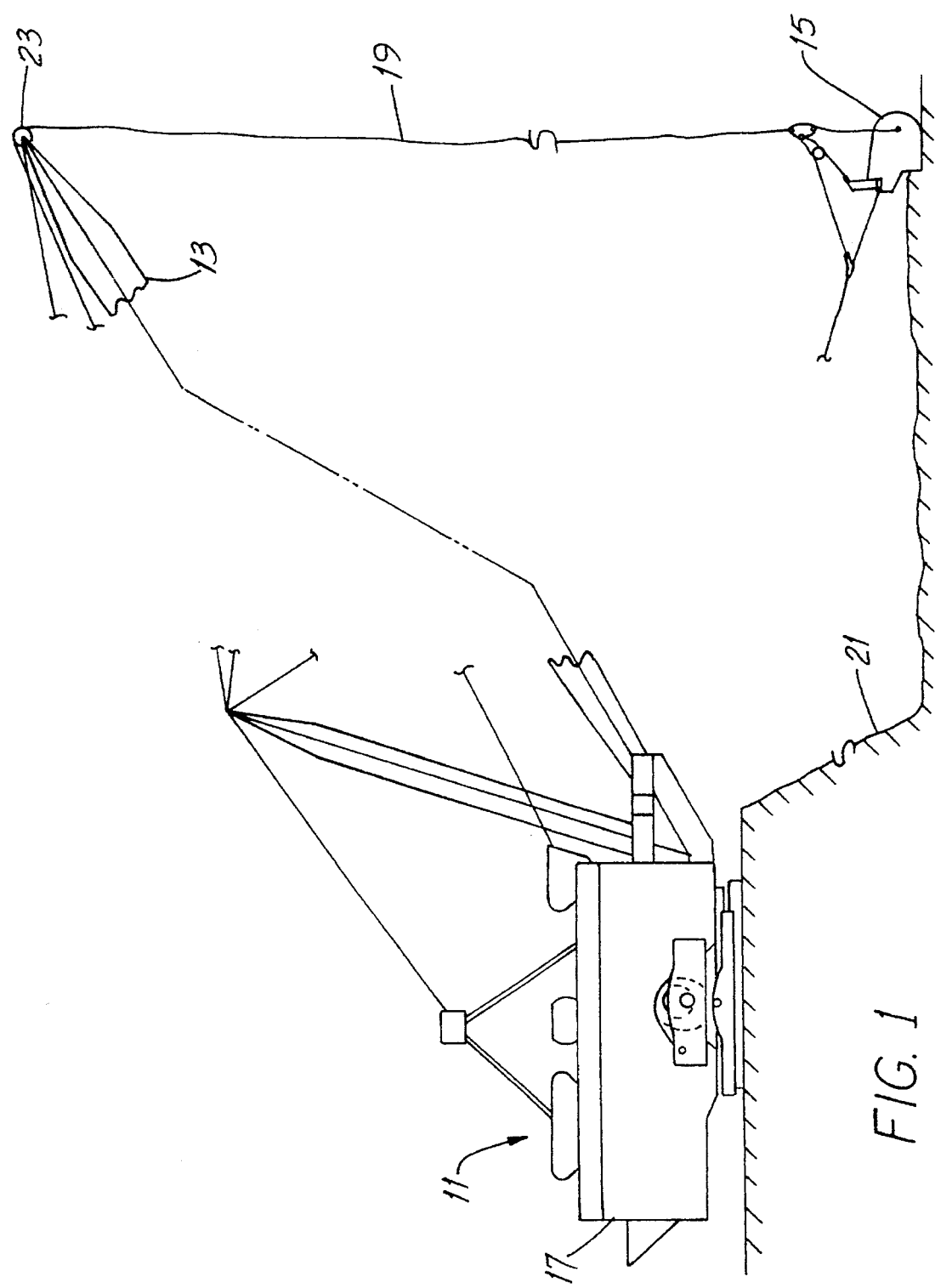
FIG. 1 is a representative side elevation view of a dragline, an exemplary type of machine with which the new bearing arrangement may be used. Parts are broken away.

Referring first to FIGS. 1 through 5, the improved bearing arrangement 10 is shown in conjunction with a dragline 11 which has an extended boom 13 to support and manipulate a digging bucket 15. Within the housing 17 are mounted the bucket hoist, bucket drag and swing systems, all of which are used to manipulate the bucket. The "rear-facing" bucket 15 is attached to the dragline 11 by ropes 19 made of stranded wire and as such bucket 15 is drawn toward the dragline 11, it becomes loaded with earth, rock or the like. When filled, the bucket 15 is hoisted above the ground 21 and the boom 13 is swung to one side for bucket emptying.

The bucket ropes 19 are supported and guided by a sheave assembly 23 having a pair of pulley-like sheaves 25 which rotate about the axis 27 as the bucket 15 is raised or lowered. The nature of the application is such that as the bucket 15 is being manipulated, it may not be vertically "on center" with the assembly 23. As a consequence, the ropes 19 tend to pull sideways on the assembly 23 as indicated by the arrows 29 in FIGS. 3 and 4.

If the sheave assembly 23 is held rigid, i.e., not permitted to oscillate slightly, such lateral loading causes significant sheave and rope wear since the rope 19 rubs against the flanges 31 of the sheaves 25. However, in more recent known designs, such wear is markedly reduced by supporting the assembly 23 in such a way that it is permitted to oscillate about the axis. To put it another ways the assembly 23 can tilt from side to side.

Figure 2A:
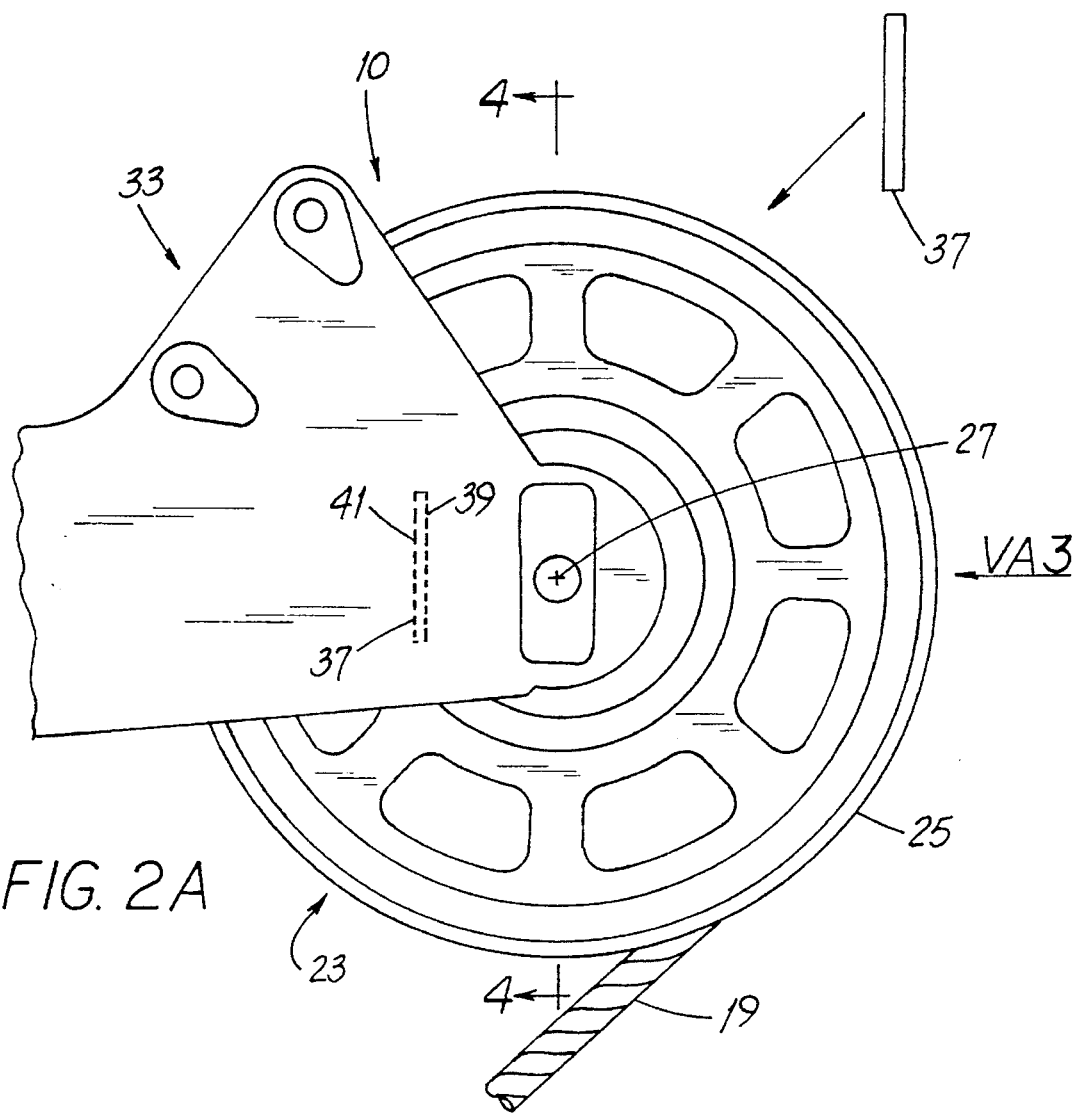
FIG. 2A is a side elevation view of the sheave assembly portion of the dragline of FIG. 1. Parts are broken away.
Figure 9:
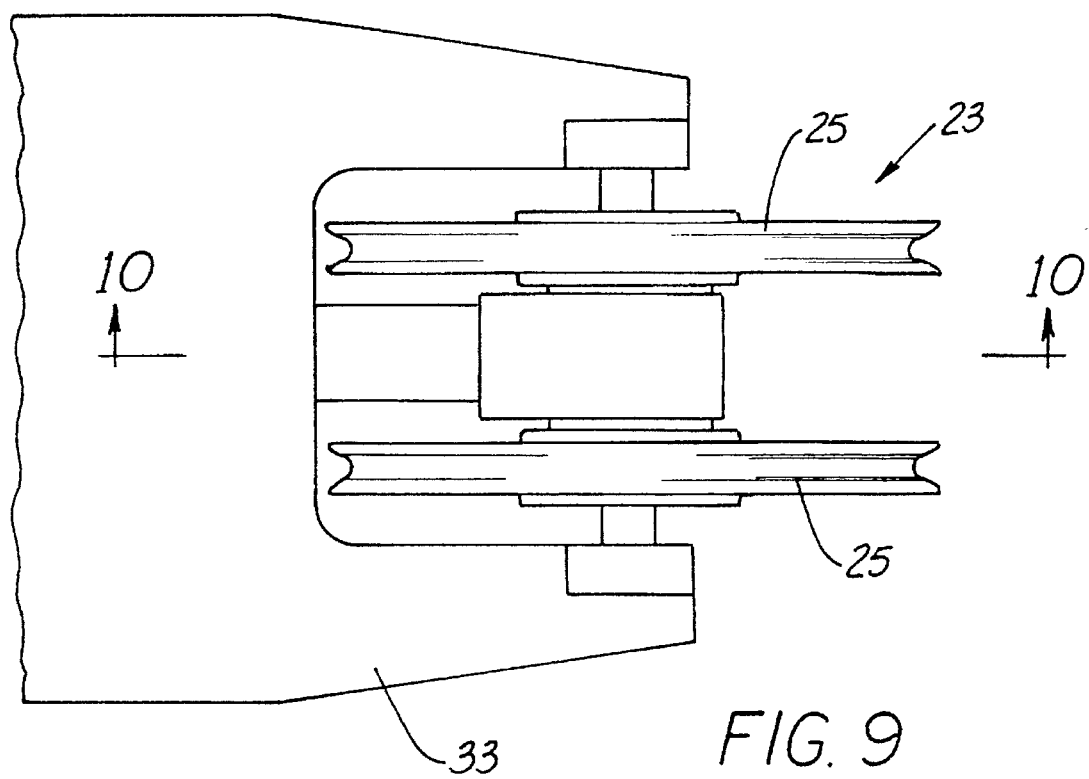
FIG. 9 is a simplified top plan view of the sheave assembly portion shown in FIG. 2A. Parts are broken away.
Figure 10:
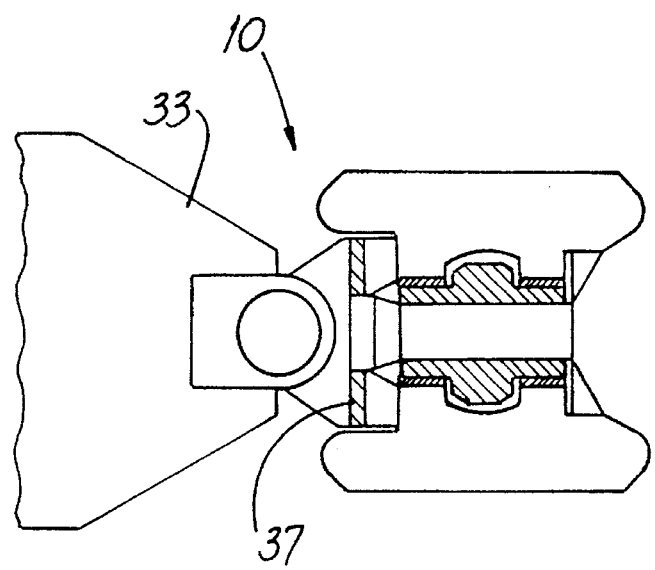
FIG. 10 is a simplified side elevation view of the sheave assembly portion shown in FIG. 9 taken generally along the viewing plane 10—10 thereof. Parts are omitted and other parts are broken away.

Referring particularly to FIGS. 2A, 9 and 10, to accommodate such relative oscillating movement between the assembly 23 and the supporting structure 33, an annular disc-shaped thrust bearing 37 is provided to support the downward force resulting from the weight of the sheave assembly 23 and from the lifting loads imposed on the ropes 19 and by the ropes 19 on the assembly 23. Earlier thrust bearings have been lubricated by such techniques as using lube grooves spaced from one and concentric with the bearing center. The resulting degree of lubrication has been less than satisfactory.

Referring particularly to FIG. 2, if there is relative motion only between the assembly 23 and the bearing 37, only the bearing face 39 need be lubricated. If there is relative motion only between the bearing 37 and the structure 33, only the face 41 needs lubrication. And, of course, if relative motion occurs in both locations, both faces 39 and 41 require lubrication.

Understanding of the following portion of the specification will be aided by certain definitional information. Such information is set forth near the end of such specification.

Figure 2B:
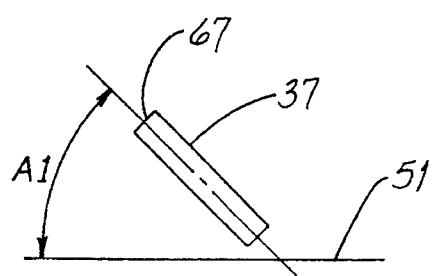
FIG. 2B is a representative view illustrating an orientation of the new bearing with respect to a horizontal plane.
Figure 4:
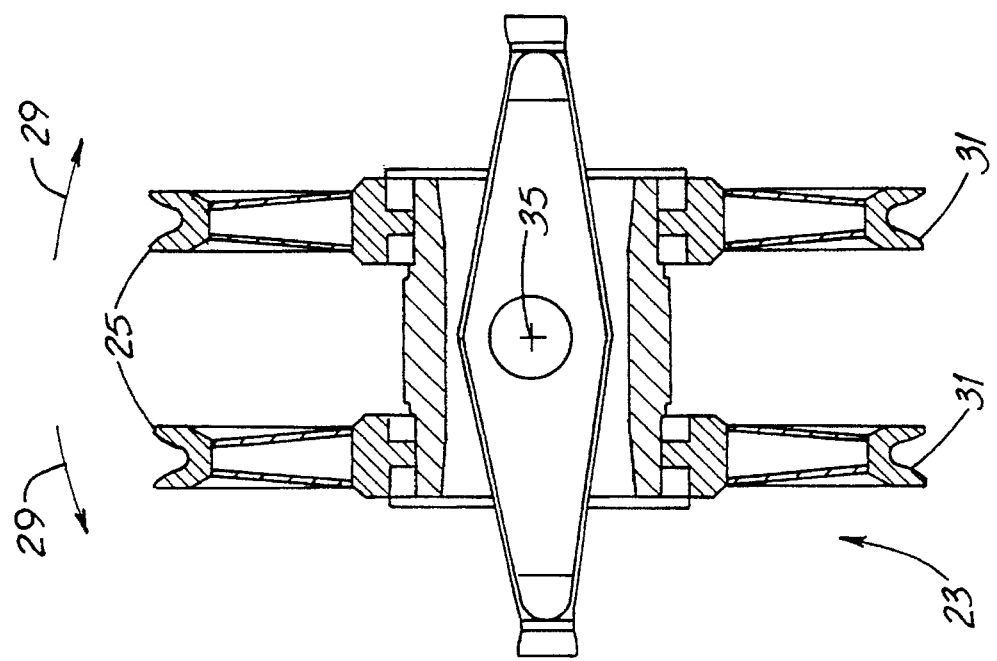
FIG. 4 is a cross-section view of the sheave assembly of FIG. 2A taken generally along the viewing plane 4—4 thereof.
Figure 3:
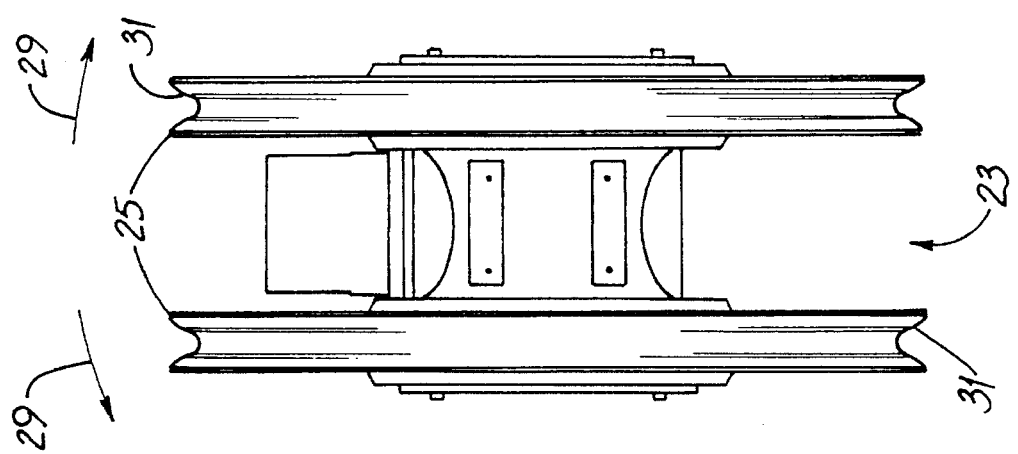
FIG. 3 is a front elevation view of the sheave assembly of FIG. 2A taken generally along the viewing axis VA3 thereof.
Figure 5:
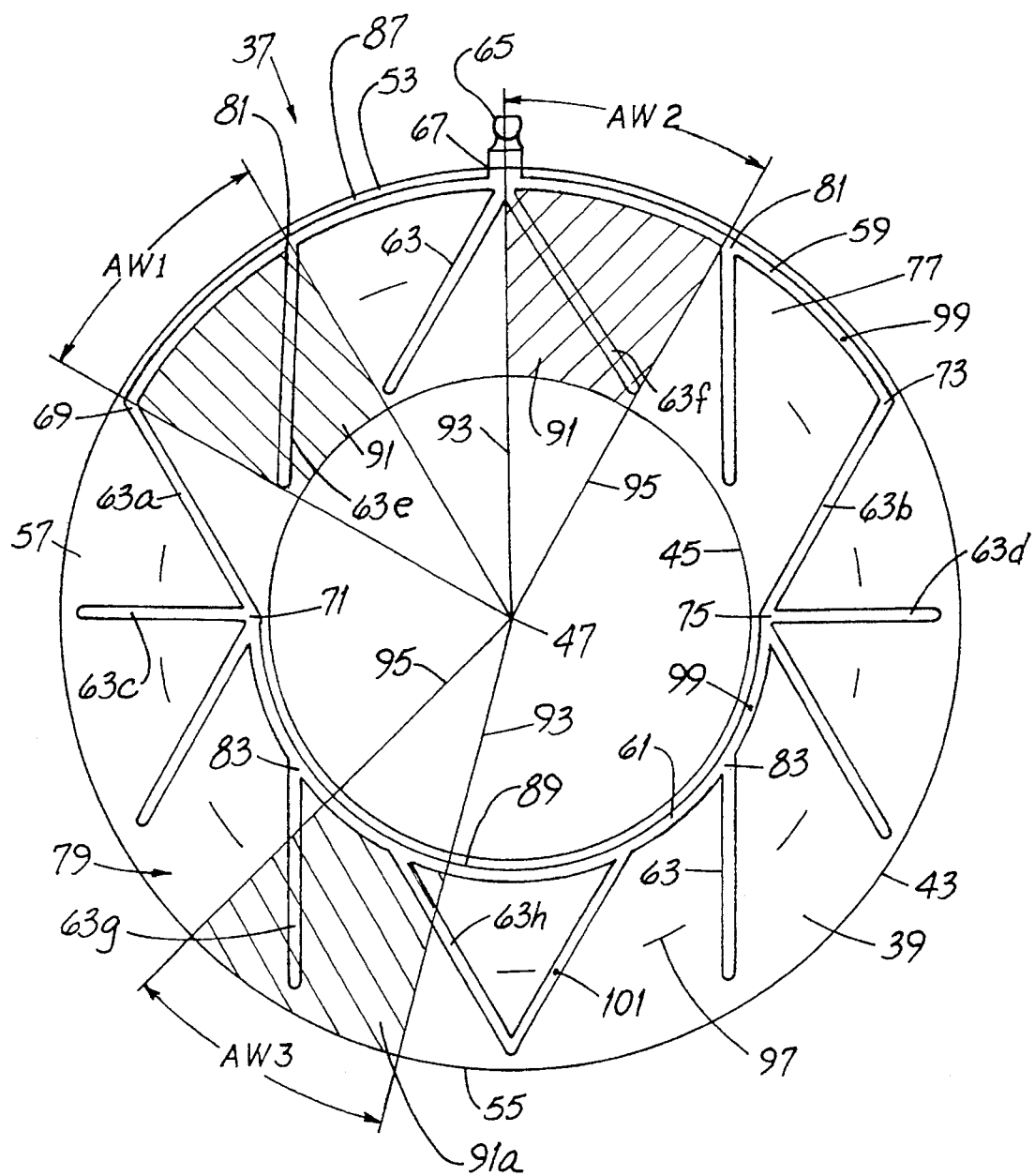
FIG. 5 is an elevation view of a face of a highly-preferred embodiment of the new gravity-lubed thrust bearing.

Referring particularly to FIG. 5, the new thrust bearing 37 is annular and has an outer edge 43, an inner edge 45, a bearing center (which is coincident with the axis 35 and about which the sheave assembly 23 pivots) and a generally flat face 39 circumscribing the center 47. Assuming the thrust bearing 37 is at an angle A1 to a horizontal reference plane 51 which is other than zero degrees (as shown in FIG. 2B and as it would be when the sheaves 25 and structure 33 of FIG. 2A are elevated as shown in FIG. 1), the bearing 37 also has a top region 53, a bottom region 55 and a midsection 57 between the regions 53 and 55.

In general, the new bearing 37 uses concentric feed passages 59 and 61 to direct lubricant to angularly-oriented grooves 63 from which lubricant is "wiped" by the oscillating motion of the sheave assembly 23. Formed in the top region 53 is a first feed passage 59, the locus of which is concentric to the bearing center 47. A second feed passage 61 is formed in the bottom region 55 and its locus is also concentric to the bearing center 47. The first feed passage 59 is connected to a lubricant feed aperture 65 and for most satisfactory gravity lubrication, such aperture 65 is at the region 67 of highest elevation above the plane 51. And other apertures may be used at other positions around the bearing 37.

The second feed passage 61 is connected to the first feed passage by grooves 63a and 63b which perform "double duty," i.e. interconnection of the passages 59 and 61 and lubrication. That is, the groove 63a connects the end 69 of the first passage 59 with the end 71 of the second passage 61 while the groove 63b connects the end 73 of the first passage 59 with the end 75 of the second passage 61. And since the grooves 63a and 63b are angular on the face 39 (rather than concentric to the center 47), lubricant is wiped from such grooves 63a and 63b by the oscillating sheave assembly 23.

A first group 77 of grooves 63 is formed in the top region 53 of the face 39 and such grooves 63 connect to the first passage 59 at respective intersections 81 and extend downward generally toward the bearing center 47. Similarly, a second group 79 of grooves 63 is formed in the bottom region 55 of the face 39. Such grooves 63 connect to the second passage 61 at respective intersections 83 and extend downward generally away from the bearing center 47.

In the vernacular (and recalling that the bearing 37 is angled with respect to the horizontal plane 51), substantially all grooves 63 "run downhill" or, like the grooves 63c and 63d, are horizontal. But in any event, none of the grooves 63 extend upward and all of the grooves 63 are below the feed aperture 65.

FIG. 5 shows that the feed passage 59 and grooves 63 of the first group 77 are spaced from the outer edge 43 by an outer barrier portion 87 which prevents significant quantities of grease from being prematurely expelled from the bearing 37 across the outer edge 43 and thereby being lost for lubrication purposes. Similarly, the feed passage 61 and grooves 63 of the second group 79 are spaced from the inner edge 45 by an inner barrier 89 portion for grease retention.

In the following part of the specification, it is assumed that the exemplary arc of oscillation AW is about 35°. That is, the sheave assembly 23 oscillates approximately 17° about the axis 35 and either side of vertical. Referring further to FIG. 5, the shading lines denote truncated sectors 91, the width of which (measured between the radials 93 and 95, respectively) is about 30° or somewhat less than the arc of oscillation AW which is about 35°.

(The foregoing sector width and arc of oscillation are exemplary. Most preferably, the arc of oscillation is equal to or greater than the sector width measured in degrees. As used in this specification, the term "arc of oscillation" means the total excursion of the oscillating assembly 23 measured in degrees.)

It is to be noted that the grooves 63e and 63f each extend across the entire arc widths AW1, AW2 of their respective sectors 91. And each of such grooves 63e and 63f extends between the outer barrier portion 87 and the inner barrier portion 89. Therefore, as the sheave assembly 23 oscillates on the face 39, the entirety of each of such sectors 91 is lubricated by grease being wiped out of the grooves 63.

It is also to be noted that, taken together, the grooves 63g and 63h extend across the entire arc width AW3 of the sector 91a. Together, such grooves 63g, 63h extend between the outer barrier portion 87 and the inner barrier portion 89. The entirety of the sector 91a is likewise lubricated by grease being wiped out of the grooves 63g, 63h. And all grooves 63 cut across a circle 97 drawn concentric with the bearing center 41.

(From the foregoing description of the mechanical arrangement, it is apparent that any point (such as point 99) on the sheave assembly 23 which is in registry with a feed passage 59 or 61 will stay in registry during oscillation. To put it another way, such a point 99 moves along, not across, the feed passage 59 or 61. Thus, there is little or no tendency for grease to be wiped out of the feed passage 59, 61. In contrast, any point such as point 101 on the sheave assembly 23 which is in registry with a groove 63 at any instant during oscillation will be out of registry as oscillation continues. Such a point 101 moves across, not along, a groove 63 and tends to wipe grease out of such groove 63.)

Figure 6:
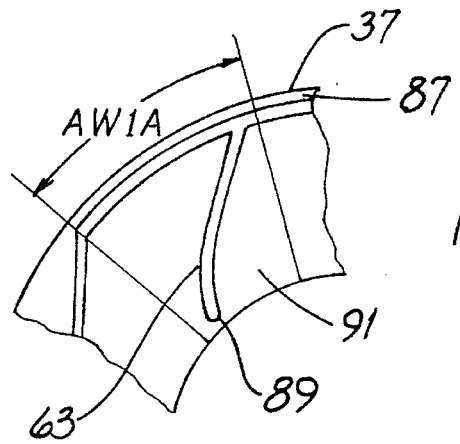
FIG. 6 is an elevation view of a portion of a face of another embodiment of the new thrust bearing. Parts are broken away.

Referring next to FIG. 6, an example of an operable but less preferred embodiment of the bearing 37 is shown. The truncated sector 91 includes a curved groove 63. And while such groove 63 extends between the outer barrier portion 87 and the inner barrier portion 89 (and could be straight rather than curved), it does not extend across the entire arc width AW1A of the sector.

The invention has been shown and described in connection with a single face 39 of the bearing 37. Referring again to FIG. 2A, it is to be appreciated that if both faces 39, 41 of such bearing 37 are subject to oscillating motion of a part rubbing thereon, the gravity-fed "passage-and-groove" arrangement described above is to be duplicated on both faces 39, 41.

Figure 7:
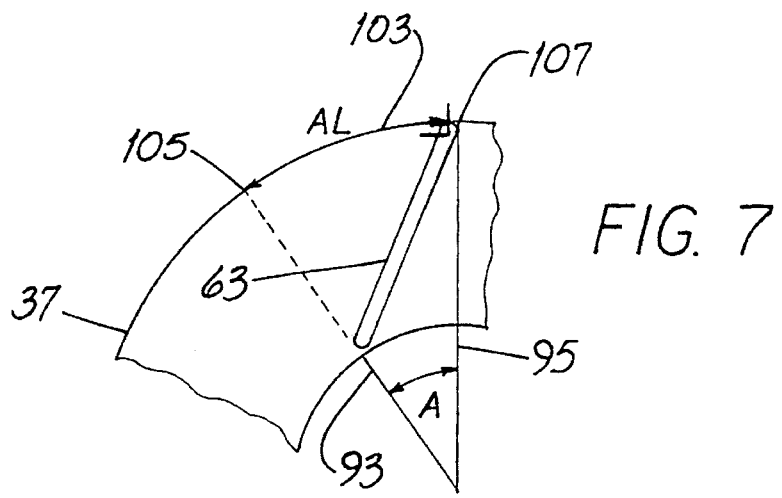
FIG. 7, provided for definitional purposes, is an elevation view of a portion of a face of the new thrust bearing. Parts are broken away.
Figure 8:
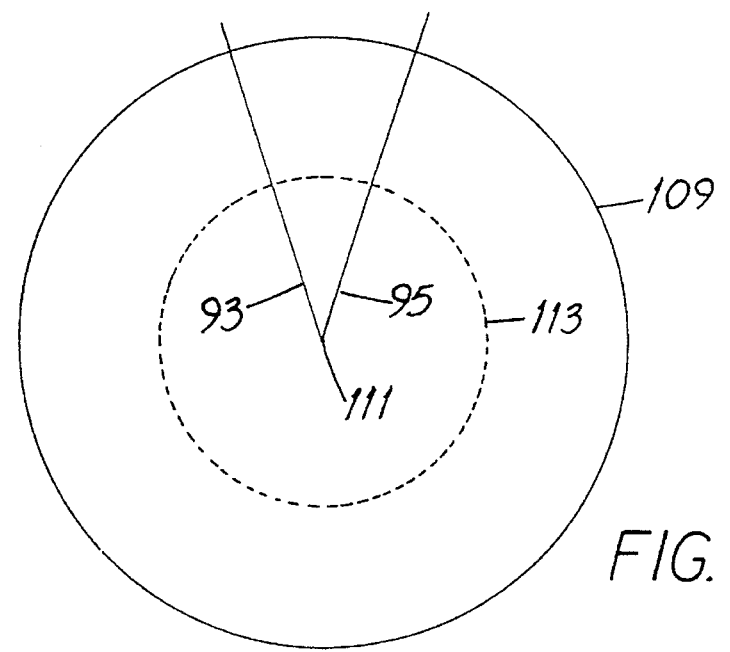
FIG. 8, provided for definitional purposes, is a circle with radii and a smaller-diameter concentric dashed circle.

Certain definitional information will be helpful in analyzing the specification. Referring to FIG. 7, the term "arc length" as applied to a groove 63 means the length (like length AL) of an arc 103 defined by points 105, 107 which are coincident with radii 93, 95 through the respective ends of the groove. Referring to FIG. 8, it will be recalled (from the field of geometry) that in a circle 109, the pie-shaped area defined by two spaced radii 93, 95 extending from the circle center 11 and intersecting the circle 109 is known as a sector. The area defined by the circle 109, the radii 93, 95 and the concentric dashed circle 113 is known as a truncated sector 91.

While the principles of the invention have been shown and described in connection with a few preferred embodiments, it is to be understood clearly that such embodiments are exemplary and not limiting.

What is claimed:

1. In the combination including (a) a generally planar thrust bearing angular to a horizontal plane and having a bearing center and a region of highest elevation above such plane, and (b) a load-support structure oscillating on the bearing, and wherein the bearing includes a plurality of lubrication grooves, the improvement wherein:

the bearing includes a lubricant feed aperture at the region;

the grooves are connected to the aperture; and at least one of the grooves intersects a circle concentric with the bearing center, whereby grooves are gravity-fed with lubricant.

2. The combination of claim 1 wherein:

the thrust bearing has a outer edge; and the grooves and the feed passage are spaced from the outer edge by an outer barrier portion, whereby lubricant is prevented from flowing across such outer edge.

3. The combination of claim 1 wherein:

the grooves are connected to the feed aperture by a feed passage having a length; and a portion of the length of the feed passage is concentric with the bearing center.

4. The combination of claim 3 wherein:

the thrust bearing has a outer edge; and the grooves and the feed passage are spaced from the outer edge by an outer barrier portion, whereby lubricant is prevented from flowing across such outer edge.

5. The combination of claim 4 wherein:

the thrust bearing has an inner edge; and the grooves and the feed passage are spaced from the inner edge by an inner barrier portion, whereby lubricant is prevented from flowing across such inner edge.

6. The combination of claim 1 wherein the grooves are below the feed aperture.

7. The combination of claim 6 wherein each of the grooves intersects a circle concentric with the bearing center.

8. The combination of claim 1 wherein:

the structure moves on the bearing through an arc of oscillation;

each of the grooves is connected to the aperture by a lubricant feed passage;

each of the grooves is connected to the feed passage at an intersection;

each of the grooves has an end; and each groove has an arc length between its end and its intersection with the feed passage which is about equal to the arc of oscillation.

9. The combination of claim 8 wherein:

the grooves are in a bearing face which circumscribes a center; and substantially all points on the feed passage are about equidistant from the center.

10. In a combination including (a) a thrust bearing having a generally flat face, and (b) a load-support structure moving on the bearing through an arc of oscillation, and wherein the face has a lubrication groove formed therein, the improvement wherein:

the groove has an end;

the bearing has a lubricant feed passage;

the groove connects to the feed passage at an intersection; and the groove has an arc length between the intersection and the end which is not greater than the arc of oscillation.

11. The combination of claim 10 wherein:

the face has a plurality of grooves formed therein;

each groove connects to the feed passage at an intersection; and each groove has an arc length between its end and its intersection with the feed passage that is not greater than the arc of oscillation.

12. The combination of claim 11 wherein:

the face circumscribes a center; and substantially all points on the feed passage are about equidistant from the center.

13. The combination of claim 11 wherein:

the bearing has an outer edge and an inner edge; and each groove extends substantially between the edges.

14. The combination of claim 10 wherein:

the bearing has a center, a top region, a bottom region and a mid-section between the regions;

the face has a first and second groups of grooves formed therein;

the feed passage is a first feed passage and is in the top region;

the bearing includes a second feed passage in the bottom region;

each groove in the first group is connected to the first feed passage and extends therefrom generally toward the center; and each groove in the second group is connected to the second feed passage and extends therefrom generally away from the center.

15. In a combination including (a) a thrust bearing having a generally flat face, and (b) a load-support structure moving on the bearing through an arc of oscillation, and wherein the face has a lubrication groove formed therein, the improvement wherein:

the bearing has an outer barrier portion, an inner barrier portion and a lubricant feed passage;

the groove connects to the feed passage at an intersection; and the groove extends between the outer barrier portion and the inner barrier portion.

16. The combination of claim 15 wherein the groove is curved.

* * * * *